United States Patent
Xue et al.

(10) Patent No.: US 7,199,732 B1
(45) Date of Patent: *Apr. 3, 2007

(54) DATA CONVERTER WITH REDUCED COMPONENT COUNT FOR PADDED-PROTOCOL INTERFACE

(75) Inventors: Ning Xue, Fremont, CA (US); Chong H Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/139,083

(22) Filed: May 26, 2005

Related U.S. Application Data

(63) Continuation of application No. 10/969,448, filed on Oct. 20, 2004.

(51) Int. Cl.
*H03M 7/00* (2006.01)
(52) U.S. Cl. .......................................... 341/61; 341/51
(58) Field of Classification Search ........... 341/50–102
See application file for complete search history.

(56) References Cited

U.S. PATENT DOCUMENTS

| | | | |
|---|---|---|---|
| 4,486,739 A | 12/1984 | Franaszek et al. | 340/347 |
| 5,199,046 A * | 3/1993 | Ling | 341/61 |
| 5,387,911 A | 2/1995 | Gleichert et al. | 341/95 |
| 5,457,456 A * | 10/1995 | Norsworthy | 341/61 |
| 6,606,328 B1 | 8/2003 | Susnow | 370/465 |
| 6,650,140 B2 | 11/2003 | Lee et al. | 326/39 |
| 6,724,328 B1 | 4/2004 | Lui et al. | 341/101 |
| 6,750,675 B2 | 6/2004 | Venkata et al. | 326/41 |
| 6,768,429 B2 | 7/2004 | Kuo et al. | 341/58 |
| 6,854,044 B1 | 2/2005 | Venkata et al. | 711/201 |
| 2001/0033188 A1 | 10/2001 | Aung et al. | 327/141 |
| 2004/0140837 A1 | 7/2004 | Venkata et al. | 327/235 |

OTHER PUBLICATIONS

Lee et al. U.S. Appl. No. 10/059,014, filed Jan. 29, 2002.
Venkata et al. U.S. Appl. No. 10/273,899, filed Oct. 16, 2002.
Venkata et al. U.S. Appl. No. 10/317,264, filed Dec. 10, 2002.
Venkata et al. U.S. Appl. No. 10/714,069, filed Nov. 14, 2003.
Walker, Rick, et al., "64b/66b coding update," Presentation at IEEE 802.3ae, Albuquerque, New Mexico (Mar. 6, 2000).

* cited by examiner

*Primary Examiner*—Lam T. Mai
(74) *Attorney, Agent, or Firm*—Fish & Neave IP Group of Ropes & Gray LLP; Jeffrey H. Ingerman

(57) ABSTRACT

A data converter, or "gearbox," for a padded protocol interface uses a reduced number of components by processing a narrower intermediate data stream, while at the same time multiplying the clock speed of its intermediate input and output so that it processes more data per clock cycle. The data streams can be narrowed to any integer factor of the original width (other than the original width).

19 Claims, 4 Drawing Sheets

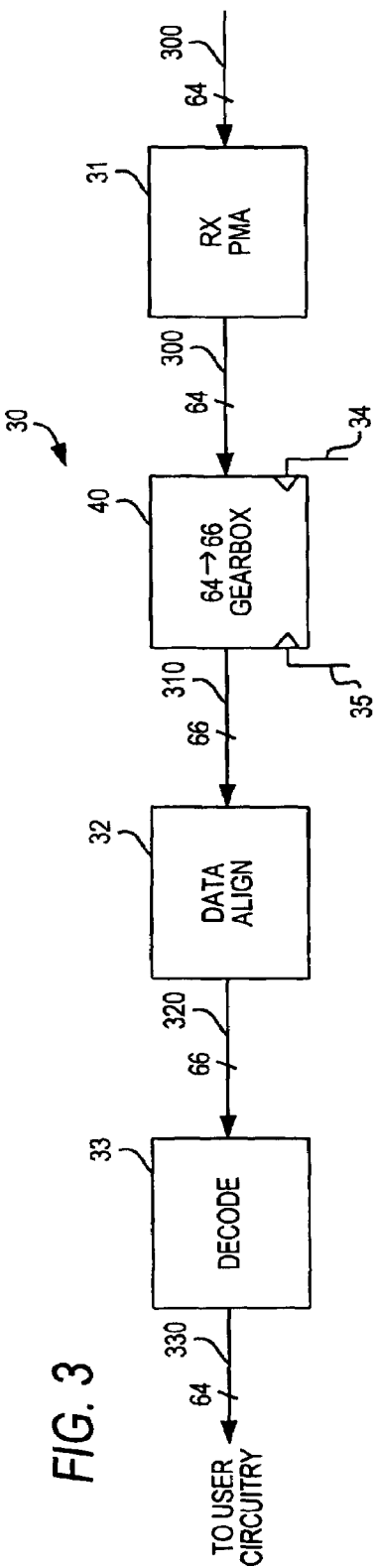

DATA CONVERTER WITH REDUCED COMPONENT COUNT FOR PADDED-PROTOCOL INTERFACE

CROSS REFERENCE TO RELATED APPLICATION

This is a continuation of copending, commonly-assigned U.S. patent application Ser. No. 10/969,448, filed Oct. 20, 2004, which is hereby incorporated by reference herein in its entirety.

BACKGROUND OF THE INVENTION

This invention relates to circuitry for handling communication of digital information to which bits are added periodically for synchronization or the like, and more particularly to an interface that allows conversion from one data width to another.

A communication protocol that is increasingly of interest is known as "64b/66b encoding." This is a protocol in which 64 bits of data are scrambled (e.g., to achieve balance between the number of binary ones and the numbers of binary zeros that need to be transmitted so that there is no net direct current in the transmission) and two additional bits having one or more particular sequences are transmitted with each 64 bits as synchronization information. Thus for every 64 bits of information that need to be sent, 64 information bits and two SYNC bits are transmitted. The SYNC bits may be the sequence "10" or "01". Extra bits of this kind may sometimes be referred to herein as "padding." There also may be similar protocols with other numbers of bits, such as 8b/10b encoding.

Serial communication of padded information can be a challenge because of possibly complicated clocking issues. For example, 66 bits of information may need to be transmitted in the time in which the data source produces 64 bits of real data. Similarly, the receiver circuitry needs to receive 66 bits in the time in which it will subsequently pass on the 64 bits of real data in that 66-bit transmission.

Circuitry for solving this problem, and allowing the different data widths to operate at different rates, so that the total number of bits transferred during a single clock cycle matches, is known, and is commonly referred to informally as a "gearbox."

In a transmitter gearbox, where the larger number of padded bits used for processing must be converted to the smaller number of bits (generally a power of 2 to be compatible with standard serializer-deserializers) for transmission, data handled internally at one width—e.g., 66 bits—are read into the gearbox in "slices" of that width. After a sufficient number of slices have been buffered, a portion of the first slice—with the number of bits in the portion being equal to the second data width—e.g., 64 bits—is read out. Next, the remaining portion of the first slice—in this case, 2 bits—is read, followed by enough—in this case, 62 bits—of the second slice to make up the second width. This continues until eventually an integral number of slices is read, and then the process repeats. The two sides of the gearbox are clocked by different clocks such that the product of each clock and its respective data width results in the same number of bits being transferred in a given time interval.

The process is reversed for the receiver gearbox, where the smaller number (again, generally a power of 2) of received bits must be converted to the larger number of padded bits for processing. Once again, the data are read into the gearbox in slices having a width of the smaller number of bits—e.g., 64 bits. After a sufficient number of slices have been buffered, the first slice is read out along with a portion of the second slice—with the number of bits in the portion being equal to the number of padding bits (in this case, two bits)—to make up the second data width—e.g., 66 bits. Next, the remainder of the second slice—in this case, 62 bits—is read along with a portion—in this case, four bits—of the third slice to make up the second, larger data width—e.g., 66 bits. Next, the remaining portion of the third slice—in this case, 60 bits—is read, followed by enough—in this case, six bits—of the fourth slice to make up the second width. This continues until eventually an integral number of slices is read, and then the process repeats. As above, the two sides of the gearbox are clocked by different clocks such that the product of each clock and its respective data width results in the same number of bits being transferred in a given time interval.

In such arrangements, because the data being read out of the gearbox can be anywhere in a slice, depending on where in the progression of slices one is, a large number of registers (e.g., flip-flops) and multiplexers is required to be able to select the correct data for a given clock cycle. It would be desirable to be able to reduce the size of such a gearbox by reducing the number of registers and/or multiplexers.

SUMMARY OF THE INVENTION

A data converter, or gearbox, according to the present invention may be reduced in size by processing, at any one time, only a fraction of the data to be processed in one clock cycle of the system of which the gearbox is a part. In order to maintain throughput at the system rate, the clock is accelerated within the gearbox.

It is preferable that there not be any unused registers or other components during any cycle of gearbox operation. Therefore, it is preferable that the number of bits to be processed during one cycle of the gearbox clock be an integer factor of the number of bits to be processed during one cycle of the system clock. The integer factor preferably is not the number itself of bits to be processed during one cycle of the system clock, because then there would be no savings in gearbox size. Thus the maximum integer factor should be other than number of bits to be processed during one cycle of the system clock. While theoretically there is no minimum, meaning that the number of bits to be processed during one cycle of the gearbox clock could be as small as one bit (1 is an integer factor of any number), in practice there is a lower limit because the smaller the number of bits processed during one cycle of the gearbox clock, the faster the gearbox clock must run. However, there are limits to the possible clock speed. For example, using current 90 nm semiconductor technology, there is an upper limit of about 500–600 MHz. From the system clock speed, the number of bits to be processed during one system clock cycle, and the maximum available gearbox clock rate, one can determine the minimum number of bits to be processed during one gearbox clock cycle.

In accordance with the present invention, there is provided, in the case of a data receiver, a data converter for accepting input data at a first data width and a first data rate, and outputting padded data at a second data width wider than the first data width and at a second data rate. The data converter includes a first rate converter receiving the input data at the first data rate and outputting the input data at a first intermediate rate, and a first number of data register units each of a register width receiving the input data at the first intermediate rate. A second number of data selector units each of a selection width are each connected to a respective transmission conductor, for routing each bit received at the register units to one of the transmission conductors. The transmission conductors transmit the padded data at a second intermediate rate. A second rate converter receives the data at the second intermediate rate and outputs the padded data at the second data rate. The second number is equal to a second integer factor of the second data width other than the second data width. A ratio of the second number to the first number is equal to a ratio of the register width to the selection width.

In the case of a data transmitter, there is provided a data converter for accepting padded input data at a first data width and a first data rate, and outputting padded data at a second data width narrower than said the first data width and at a second data rate. The data converter includes a first rate converter receiving the padded input data at the first data rate and outputting the padded input data at a first intermediate rate on a first number of transmission conductors. A first number of data selector units, each of a selection width and each connected to one of the transmission conductors, routes each bit received at the selector units onto one of said transmission conductors. A second number of data register units, each of a register width, receive the padded input data routed at the first intermediate rate from the data selector units, and output the padded data at a second intermediate rate. A second rate converter receives the padded data at the second intermediate rate and outputs the padded data at the second data rate. The first number is equal to a first integer factor of the first data width other than the first data width. A ratio of the first number to the second number is equal to a ratio of the register width to the selection width.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 3 is a schematic block diagram of a padded protocol receiver including a data converter in accordance with the present invention;

FIG. 4 is a schematic block diagram showing detail of the data converter shown in FIG. 3;

DETAILED DESCRIPTION OF THE INVENTION

Figure 1:
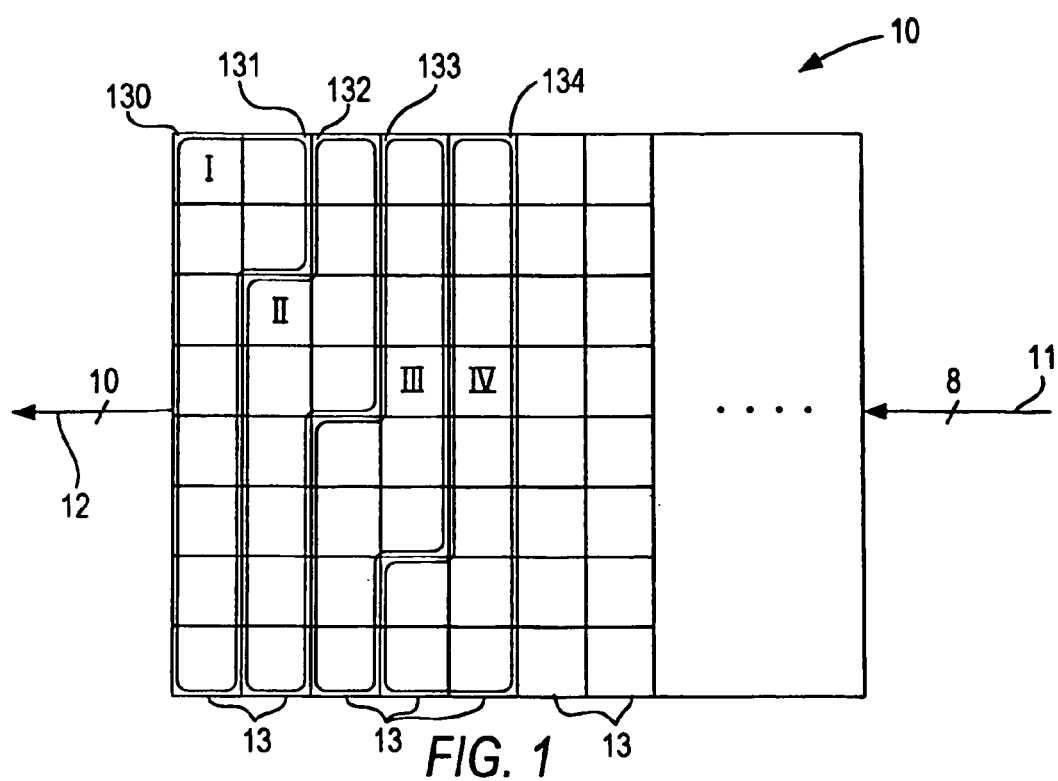
FIG. 1 is a schematic illustration of the operation of data converters of the type of which the present invention is an improvement, where the output data stream is wider than the input data stream.

Operation of a data converter, or gearbox, generally, is illustrated in FIG. 1, which shows a conceptual representation of a gearbox 10 of a type in which the output data stream is wider than the input data stream. For ease of illustration, a case of 8b/10b encoding will be illustrated, but the principles are the same in the case of 64b/66b encoding, or any other encoding scheme in which the output data stream is wider than the input data stream. As shown, input data stream 11 is 8 bits wide while output data stream 12 is 10 bits wide. Gearbox 10 is divided into a plurality of 8-bit-wide "slices" 13. As discussed below, one embodiment of the actual construction of gearbox 10 and slices 13 may include various registers and multiplexers, but for purposes of FIG. 1 it is sufficient that slice 13 is, in this example, 8 bits wide.

Input data 11 sequentially fills slices 13. At the output, 10 bits are read out. Thus, in cycle I, 8 bits are read from slice 130, along with two bits from slice 131, to make up 10 bits. 6 bits remain in slice 131. In cycle II, the 6 bits remaining in slice 131 are read out, along with 4 bits from slice 132, leaving 4 bits in slice 132. In cycle III, the 4 bits remaining in slice 132 are read out, along with 6 bits from slice 133, leaving 2 bits in slice 133. In cycle IV, the 2 bits remaining in slice 133 are read out along with all 8 bits in slice 134. The sequence begins again on the fifth cycle.

Figure 2:
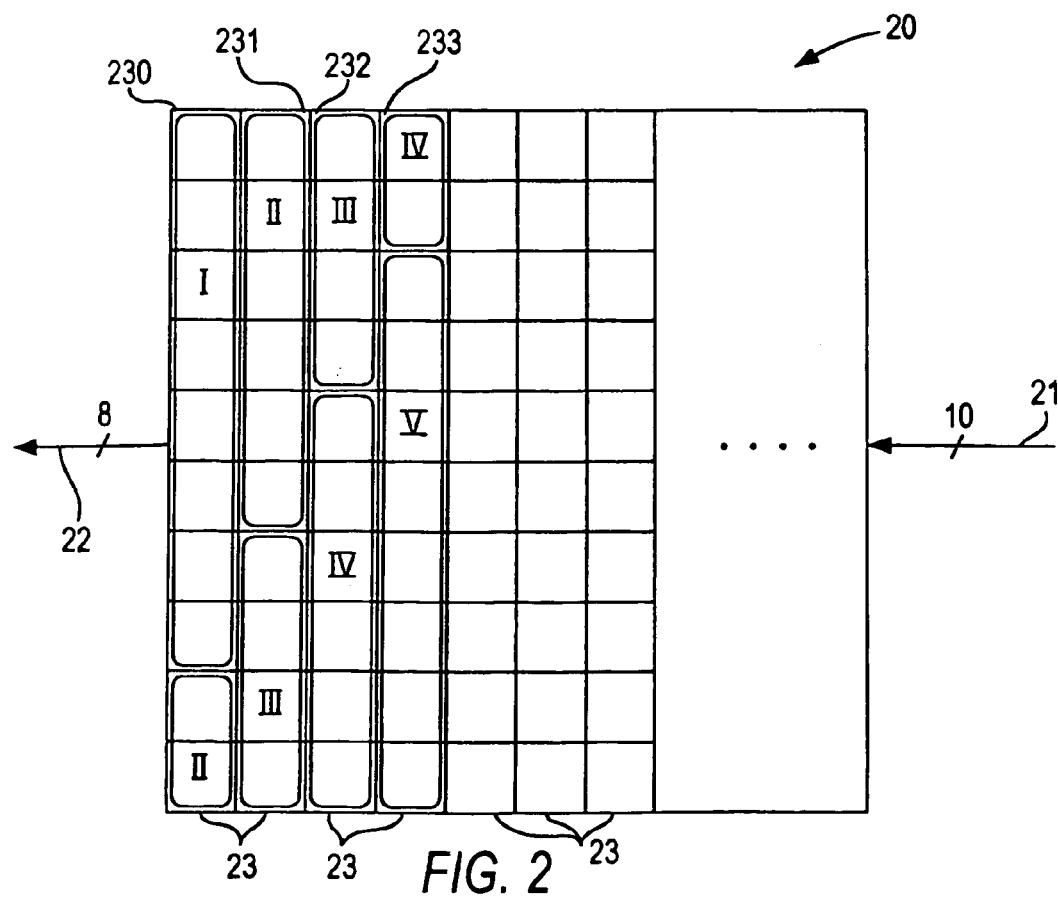
FIG. 2 is a schematic illustration of the operation of a data converter similar to that in FIG. 1, where the input data stream is wider than the output data stream.

As shown in FIG. 2, the operation of gearbox 20, where the input data stream 21 is 10 bits wide while output data stream 22 is 8 bits wide, is similar. Input data 21 sequentially fills slices 23. At the output, 8 bits are read out. Thus, in cycle I, 8 bits are read from slice 230, leaving two bits in slice 230. In cycle II, the 2 bits remaining in slice 230 are read out along with 6 bits from slice 231, leaving 4 bits in slice 231. In cycle III, the 4 bits remaining in slice 231 are read out, along with 4 bits from slice 232, leaving 6 bits in slice 232. In cycle IV, the 6 bits remaining in slice 232 are read out along with 2 bits from slice 233, leaving 8 bits in slice 233. In cycle V, the 8 bits remaining in slice 233 are read out. The sequence begins again on the sixth cycle.

The invention will now be described with reference to FIGS. 3–6.

FIG. 3 shows a padded protocol receiver 30 incorporating a data converter (gearbox) 40 in accordance with the present invention. Receiver 30 preferably includes physical medium attachment ("PMA") module 31, gearbox 40, data alignment module 32 and decoder 33.

In this example, 64-bit-wide data 300 are received by receiver PMA module 31 from an external source. Although transmitted as 64-bit-wide data (in fact, these data may be transmitted in four 16-bit groups for compatibility with existing serializer-deserializers), the data are actually 66-bit data, encoded from 64-bit source data using 64b/66b encoding. The 64-bit-wide 66-bit received data 300 are conducted to gearbox 40 where they are converted to 66-bit-wide 66-bit data 310. These 66-bit-wide 66-bit data 310 are the data as encoded at the source from the original 64-bit source data, and including two padding bits in every 66 bits of data.

As is well known in connection with high-speed serial interfaces of this type, although gearbox 40 has converted the data back to its 66-bit format, the beginning and end of each 66-bit "word" is not known, and the 66-bit groupings 310 output by gearbox 40 (as well as the 64-bit groupings output by PMA module 31) are arbitrary. These unaligned 66-bit-wide 66-bit data 310 are input to data alignment module 32, which outputs aligned 66-bit-wide 66-bit data groupings 320 that match the 66-bit data from the original source, before it was converted to 64-bit format for transmission. Data alignment module 32 uses well known data alignment techniques to find certain markers in the data, allowing them to be aligned. The specifics of these techniques form no part of the present invention, and will not be described further.

After being aligned by data alignment module 32, the aligned data 320 are input to decoder 33, which strips out the padding bits, outputting the original 64-bit-wide 64-bit source data 330, which is used by the user circuitry of the device of which receiver 30 is a part.

Gearbox 40 preferably is clocked by two clock signals 34, 35, which preferably are derived using suitable clock division techniques from a single source clock. For example, in a high-speed interface using 64b/66b encoding, the clock 34 for the 64-bit data 300 may be about 161.13 MHz, while the clock 35 for the 66-bit data 310 may be about 156.25 MHz. Both of these clocks may be derived from a single 10.312 GHz clock (10.312 GHz/66≈156.25 MHz, and 10.312 GHz/64≈161.13 MHz). One clock division technique that may be used to derive these two clocks from a single 10.312 GHz clock may be similar to the technique shown in copending, commonly-assigned U.S. patent application Ser. No. 10/714, 069, filed Nov. 14, 2003, which is hereby incorporated by reference herein in its entirety.

The details of gearbox 40 are shown in FIG. 4. Incoming 64-bit data 300 preferably are input to a 1-to-4 data rate converter 41 and preferably output as a 16-bit data stream 410 at four times the clock rate (e.g., in the case of 161.13 MHz 64-bit input data, the 16-bit data are output at about 644.52 MHz). The structure of data rate converter 41 preferably is conventional, and may include four 16-bit buffers (not shown) into which the 64-bit data are clocked at the lower system clock rate for received data (e.g., in this case, 161.13 MHz), and a clock, derived from the same source at the system clock (e.g., in this case, from the 10.312 GHz master clock), running at four times the system's received data clock rate (e.g., in this case, 644.52 MHz). Thus, in the same time that it takes to read in one group of 64 bits, 64 bits can be read out in four 16-bit groups.

The 16-bit data 410 preferably are input into each of 22 16-bit registers 42, whose outputs preferably are input to 22 16-to-1 multiplexers 43. Registers 42 preferably represent, collectively, the slices 13 described above, and multiplexers 43 preferably function as selectors to select the appropriate bits from each slice in the manner described in connection with the description of FIG. 1, above. The result preferably is a 22-bit data stream 44 at 468.75 MHz, which is then converted by 3-to-1 data rate converter 45 (similar in construction to 1-to-4 data rate converter 41) to a 66-bit output data stream 46 at 156.25 MHz (468.75 MHz÷3).

It should be noted that the selection of 16 bits as the width of the intermediate input data upconverted from the original 64 bits is relatively straightforward, insofar as 64 is a power of 2, and can be converted relatively easily to any other power of 2. The selection of 22 bits as the width of the intermediate output data is somewhat less straightforward. Essentially any integer factor of the ultimate desired output width (in this example, 66) would work. Thus, in the case of a 66-bit output width, the intermediate data width could be 1, 2, 3, 11, 22 or 33. 66 also is an integer factor of 66, but clearly will not result in a reduction in the number of gates used in the gearbox. Insofar as the goal of the present invention is to reduce size or gate count of the gearbox, the lowest possible number should be favored. However, the lower the number of intermediate bits, the faster the intermediate clock must run. As discussed above, with current 90 nm semiconductor process technology, a clock speed of 500–600 MHz is about the highest that can be expected. An intermediate data width of 22 results in an intermediate clock speed of 468.75 MHz. Any smaller width—e.g., even 11 bits, which is the next available factor—would require a clock speed that, using present semiconductor technology, is unattainably high.

The intermediate output data width determines the number of multiplexers. Once that number has been determined, the number of registers is determined based on the ratio of the register width to the multiplexer width, with the ratio of the number of registers to the number of multiplexers equaling the inverse of the ratio of the register width to the multiplexer width. In the example above, both ratios are 16:16, or 1:1, meaning that the number of registers is the same as the number of multiplexers. If, however, the register width were 8, then the ratio of the register width to the multiplexer width would be 1:2, so that the ratio of the number of registers to the number of multiplexers would be 2:1, meaning that the number of registers would be 44 instead of 22.

Although the speeds of the input and output sides of gearbox 40 are theoretically independent (note that a factor of three is used on one side while a factor of four is used on the other side), the respective rates have to be such that excessive storage capacity (in terms of either hold time or additional registers) not be required. Therefore, the output rate preferably should be of about the same order of magnitude as the input rate, as in the example of gearbox 40 as described above.

Assuming one flip-flop for each bit in each register 42, gearbox 40, with 22 16-bit registers 42 would include 22×16=352 flip-flops, plus 110 additional flip-flops for the two rate converters 41, 45, plus 22 16-to-1 multiplexers, which translates to 4,928 gates using a TSMC cell library gate unit. By comparison, a conventional 64/66 gearbox may include 33 64-bit registers, or 33×64=2,112 flip-flops, plus 66 32-to-1 multiplexers, which translates to more than 23,000 gates using a TSMC cell library gate unit. Thus, the invention achieves a substantial reduction in gate count (here, more than a factor of 4), which also directly affects size and power consumption.

Figure 5:
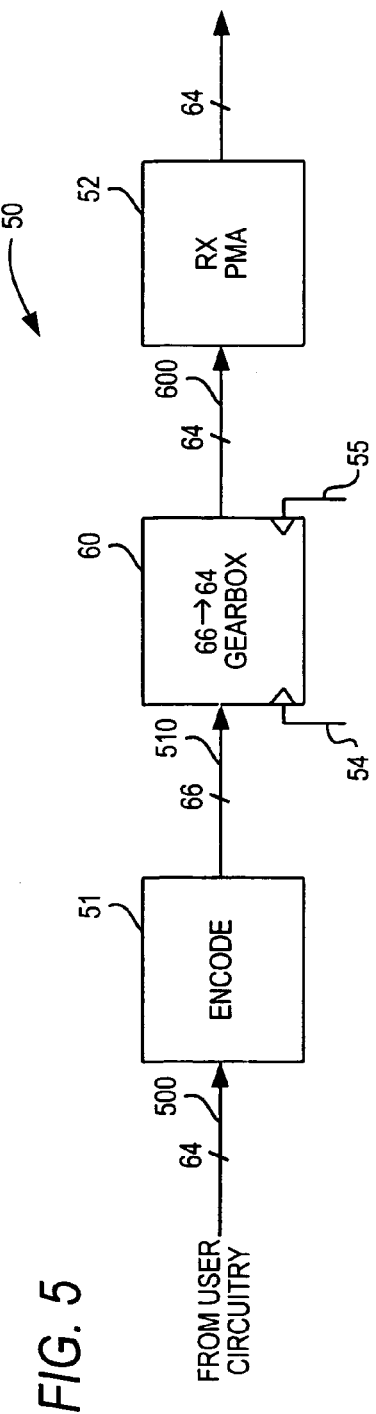
FIG. 5 is a schematic block diagram of a padded protocol transmitter including a data converter in accordance with the present invention.

FIG. 5 shows a padded protocol transmitter 50 incorporating a data converter (gearbox) 60 in accordance with the present invention. Transmitter 50 preferably includes encoder 51, gearbox 60 and physical medium attachment ("PMA") module 52.

In this example, 64-bit-wide 64-bit data 500 preferably are received by encoder 51 from a user source (i.e., the logical output of a device of which transmitter 50 is a part). Encoder 51 preferably adds appropriate padding bits and outputs appropriately "framed" 66-bit-wide 66-bit data 510 at 53. Gearbox 60 then preferably converts the 66-bit-wide 66-bit data 510 into 64-bit-wide 66-bit data 600 in the manner described above, and outputs the 64-bit-wide 66-bit data 600 to transmitter PMA module 52 for transmission to its destination. No alignment module is needed in transmitter 50, because unlike receiver 30, transmitter 50 is part of the system that generated the source data, and therefore "knows" the word boundaries of the data.

Gearbox 60 preferably is clocked by two clock signals 54, 55, which preferably are derived using suitable clock division techniques from a single source clock. For example, as above, clocks 54, 55 may be about 156.25 MHz and about 161.13 MHz, respectively, preferably derived from a single 10.312 GHz clock.

Figure 6:
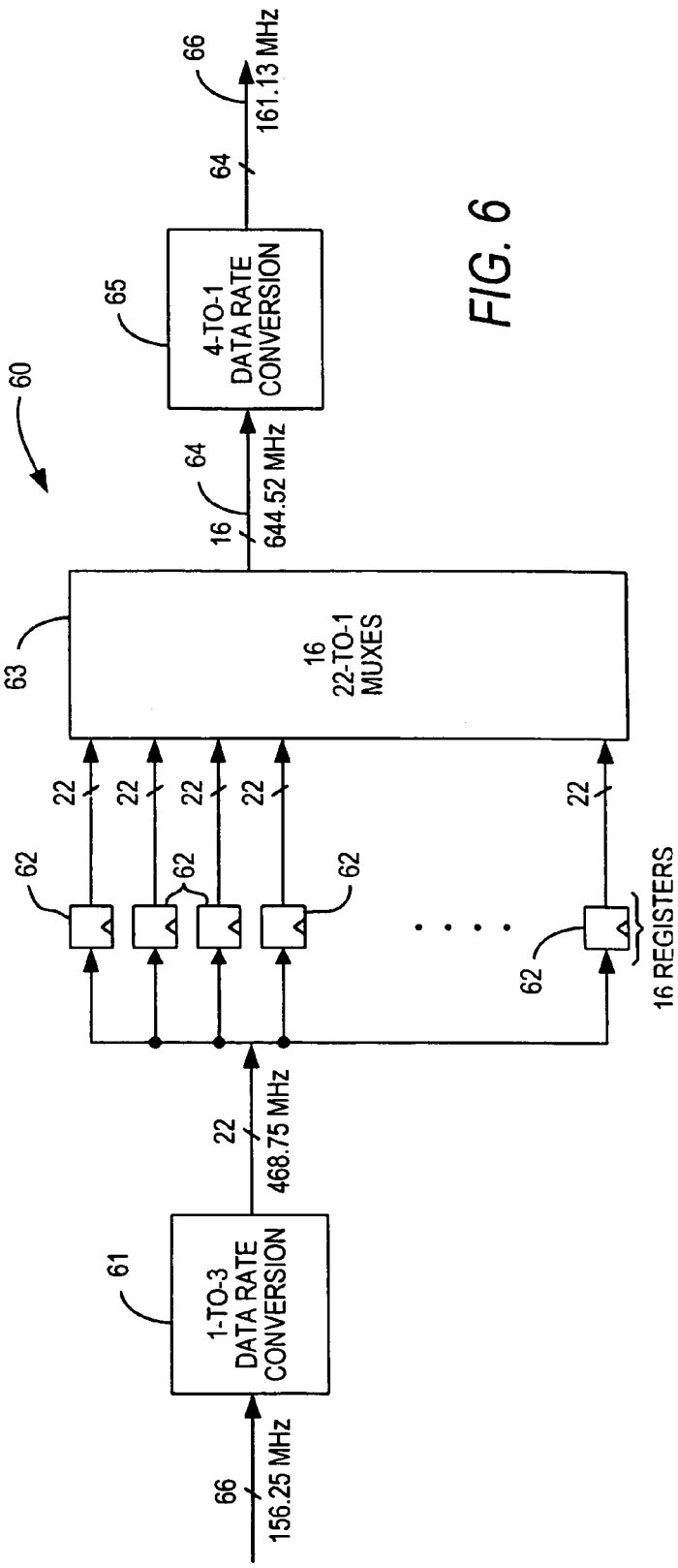
FIG. 6 is a schematic block diagram showing detail of the data converter shown in FIG. 5.

The details of gearbox 60 are shown in FIG. 6. Incoming 66-bit data preferably are input to a 1-to-3 data rate converter 61 and preferably output as a 22-bit data stream at three times the clock rate (e.g., in the case of 156.25 MHz 66-bit input data, the 22-bit data are output at about 468.75 MHz). Thus, in the same time that it takes to read in one group of 66 bits, 66 bits can be read out in three 22-bit groups.

The 22-bit data preferably are input into each of 16 22-bit registers 62, whose outputs preferably are input to 16 22-to-1 multiplexers 63. Registers 62 preferably represent, collectively, the slices 23 described above, and multiplexers 63 preferably function as selectors to select the appropriate bits from each slice in the manner described in connection with the description of FIG. 2, above. The result preferably is a 16-bit data stream 64 at 644.52 MHz, which is then converted by 4-to-1 data rate converter 65 to a 64-bit output data stream 66 at 161.13 MHz (644.52 MHz÷4). (For compatibility with available serializer-deserializers, this 64-bit data stream may actually be transmitted in 16-bit portions.)

The savings in component count and area is comparable to that of gearbox 40. And as in the case of gearbox 40, the ratio of the number of multiplexers to the number of registers is equal to the ratio of the register width to the multiplexer width.

A gearbox according to the present invention may be used in a programmable logic device ("PLD"), that is programmably configurable to handle any of a plurality of communication protocols, including a padded protocol as described above.

Figure 7:
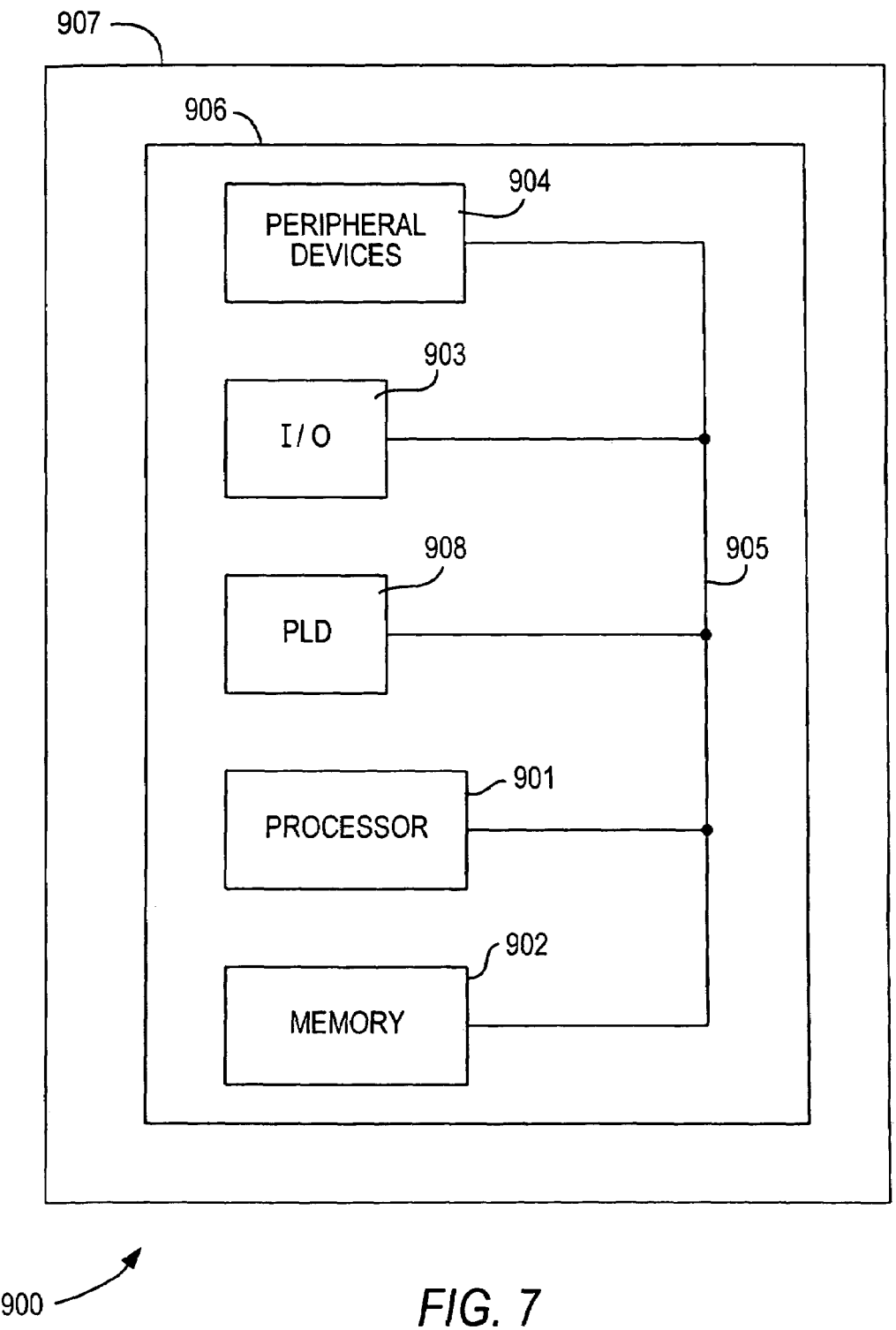
FIG. 7 is a simplified block diagram of an illustrative system employing a data converter in accordance with the present invention.

A PLD 908 incorporating one or more transceivers using the components described above according to the present invention may be used in many kinds of electronic devices. One possible use is in a data processing system 900 shown in FIG. 7. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 908 can be used to perform a variety of different logic functions. For example, PLD 908 can be configured as a processor or controller that works in cooperation with processor 901. PLD 908 may also be used as an arbiter for arbitrating access to a shared resources in system 900. In yet another example, PLD 908 can be configured as an interface between processor 901 and one of the other components in system 900. It should be noted that system 900 is only exemplary, and that the true scope and spirit of the invention should be indicated by the following claims.

Various technologies can be used to implement PLDs 908 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A data converter for accepting input data at a first data width and a first data rate, and outputting data at a second data width different from said first data width and at a second data rate, said data converter comprising:
   a first rate converter receiving said input data at said first data rate and outputting said input data at a first intermediate data rate;
   a second rate converter receiving said input data at said first intermediate data rate and outputting data at a second intermediate data rate, said second rate converter comprising:
   a first number of data register units each having a register width, and
   a second number of data selector units each having a selection width, and each having as inputs at least one output of said data register units; and
   a third rate converter receiving said data at said second intermediate data rate and outputting data at said second data rate; wherein:
   said second number is equal to an integer factor of said second data width other than said second data width.

2. The data converter of claim 1 wherein each of said data selector units is of a selection width and each is connected to a transmission conductor, for routing each bit received at said register units to one of said transmission conductors, said transmission conductors transmitting said data at said second intermediate rate.

3. The data converter of claim 2 wherein a ratio of said second number to said first number is equal to a ratio of said register width to said selection width.

4. The data converter of claim 1 wherein said second data width is wider than said first data width.

5. The data converter of claim 1 wherein said second data width is narrower than said first data width.

6. The data converter of claim 1 wherein a product of said second number and a ratio of said second intermediate data rate to said second data rate is equal to said second data width.

7. The data converter of claim 1 wherein a ratio of said second data rate to said first data rate is substantially equal to a ratio of said first data width to said second data width.

8. The data converter of claim 7 wherein a ratio of said first intermediate data rate to said second intermediate data rate is substantially equal to a ratio of said selection data width to said register width.

9. The data converter of claim 1 wherein a ratio of said first intermediate data rate to said second intermediate data rate is substantially equal to a ratio of said selection data width to said register width.

10. A programmable logic device comprising a data converter according to claim 1.

11. A digital processing system comprising:
    processing circuitry;
    a memory coupled to said processing circuitry; and
    a programmable logic device as defined in claim 10 coupled to the processing circuitry and the memory.

12. A printed circuit board on which is mounted a programmable logic device as defined in claim 10.

13. The printed circuit board defined in claim 12 further comprising:
    memory circuitry mounted on the printed circuit board and coupled to the programmable logic device.

14. The printed circuit board defined in claim 13 further comprising:
    processing circuitry mounted on the printed circuit board and coupled to the memory circuitry.

15. A data conversion method for accepting input data at a first data width and a first data rate, and outputting data at a second data width wider than said first data width and at a second data rate, said method comprising:
    receiving said input data at said first data rate and said first data width, and outputting said input data as first intermediate data at a first intermediate data rate and a first intermediate data width;

converting said first intermediate data to second intermediate data at a second intermediate data rate and a second intermediate data width; and receiving said second intermediate data at said second intermediate data rate and said second intermediate data width, and outputting said data at said second data rate and said second data width; wherein:

said second intermediate data width is equal to an integer factor of said second data width other than said second data width.

16. The method of claim 15 wherein said converting comprises selecting data bits from said first intermediate data and routing each selected bit to one of a plurality of transmission conductors as said second intermediate data at a second intermediate rate, said plurality of transmission conductors defining said second intermediate data width.

17. The method of claim 15 wherein a ratio of said second data rate to said first data rate is substantially equal to a ratio of said first data width to said second data width.

18. The method of claim 16 wherein a ratio of said first intermediate data rate to said second intermediate data rate is substantially equal to a ratio of said second intermediate data width to said first intermediate data width.

19. The method of claim 15 wherein a ratio of said first intermediate data rate to said second intermediate data rate is substantially equal to a ratio of said second intermediate data width to said first intermediate data width.

* * * * *